United States Patent Office 3,073,778
Patented Jan. 15, 1963

3,073,778
METHOD OF PREPARING ODORLESS NAPHTHAS
George W. Ayers, Chicago, and William A. Krewer, Arlington Heights, Ill., assignors to The Pure Oil Company, Chicago, Ill., a corporation of Ohio
No Drawing. Filed Nov. 9, 1959, Ser. No. 851,545
6 Claims. (Cl. 208—289)

This invention relates to the preparation of odorless industrial naphthas. More particularly, this invention relates to the improvement of the odor quality of odorless naphthas by treatment with an alkaline aqueous solution containing hydrazine and/or one or more hydrazine derivatives, to include hydrazine, hydrazine hydrate, hydrazine salts, monoalkylhydrazines and N,N-dialkylhydrazines, salts of monoalkylhydrazines, and salts of N,N-dialkylhydrazines, in which the alkyl groups contain up to 6 carbon atoms, and mixtures of the aforementioned compounds. For simplicity in this description, the term "hydrazine compounds" will be used to include the forementioned group of compounds.

Because of the inherent qualities and advantages of odorless naphthas, such as their non-toxicity, good solvent properties, low cost, and availability, they are used in many industrial services, particularly in the surface coating industry. Naphthas are generally defined as hydrocarbon mixtures of various boiling ranges, usually with end boiling points below 550° F., but occasionally between 550° and 600° F. Most of them are obtained by fractional distillation of petroleum; others are obtained by the fractional distillation of alkylates or of coal tar, or from the solvent extraction of petroleum fractions. Within this definition are included such products as straight-run petroleum naphthas, heavy naphthas, odorless naphthas, coal-tar naphthas, and aromatic petroleum naphthas. All of these naphthas have very pronounced odors except in the case of odorless naphthas as prepared by the fractional distillation of heavy alkylates, or by the treatment of straight-run petroleum naphthas with silica gel. Naphthas boiling below 300° F. are not odorless because the hydrocarbons themselves have odors. Naphthas with initial boiling points between 300° and 350° F., and particularly between 340° and 360° F., may be essentially odorless if prepared by careful fractional distillation of heavy alkylates, or by percolation of straight-run petroleum naphthas of comparable boiling range through silica gel until essentially all of the aromatic hydrocarbons are removed. Fractional distillation of heavy alkylates oftentimes gives unpredictable results and the products may contain small amounts of odorous compounds, the exact composition of which is unknown but which may include aldehydes, ketones, sulfur compounds, or even unsaturated hydrocarbons. Many of the odorous compounds are very tenacious and the odor of the naphtha product is little improved, or even made more disagreeable, by ordinary caustic soda treatment. Specific applications of odorless naphthas require that they be of high and uniform quality. This invention is directed to one of the more perplexing problems, that of improving the odor of such naphthas so that uniform, commercially-acceptable products are obtained.

Although many refining processes are available which remove substantial amounts of obnoxious sulfur compounds which impart odors to naphthas, these processes do not always give results which are consistent, and such processes are not applicable to heavy alkylates. There are many claims made in the art to processes for removing some of the odorous compounds from hydrocarbons or changing them into less odorous substances. These processes may be classified as sweetening, solvent extraction, and adsorption processes. However, because of the peculiar nature of odor formation in naphthas, and the stringent odor specification of odorless naphthas, these prior art chemical and physical methods cannot be depended upon to give uniform satisfactory results.

In accordance with the present invention, it has been found that the odor quality of essentially odorless naphtha is improved, and the odor stability maintained during storage for extended periods of time, by treatment with solutions, particularly aqueous solutions, containing hydrazine compounds and an alkali metal hydroxide. It has been found that in treating essentially odorless naphthas with aqueous solutions containing hydrazine compounds and an alkali metal hydroxide, the odorous materials are destroyed or removed. The reaction of this invention and the odorous aqueous treating agent of this invention and the odorous materials is quite rapid and the treatment can be effected by countercurrent continuous processing of the nearly odorless naphthas using known liquid-liquid contact methods. The treating operation may be carried out at temperatures from room temperature to as high as 200° F., the lower temperature limit being that at which the treating solution is still fluid. The process of this invention is a liquid-liquid contacting process and may be conducted batch-wise by mixing together the naphtha and the alkaline treating solution containing the hydrazine compound, or mixtures thereof, and allowing phase separation wherein the odor-free naphtha forms the upper phase. The treatment may also be carried out, although less effectively, by allowing the borderline or poor-odor-quality odorless naphtha to overlay an alkaline aqueous solution of the hydrazine compound. Other methods of application will become apparent from a further description of this invention.

Accordingly, it becomes a primary object of this invention to provide a process of preparing odorless industrial naphthas.

The second object of this invention is to provide a process for preparing odorless industrial naphthas by the treatment of unstable but nearly odor-free naphthas with an aqueous solution containing one or more hydrazine compounds, and an alkali metal hydroxide.

Still another object of this invention is to provide a process for removing odorous materials from hydrocarbon mixtures, particularly heavy alkylates, by treatment or extraction with aqueous alkaline solutions containing hydrazine, an alkylhydrazine, or a N,N-dialkylhydrazine, as a preferred embodiment thereof.

These and further objects of the invention will become apparent or be described as the specification herein proceeds.

In order to demonstrate the invention, the following examples are presented:

EXAMPLE I

A 90 cc. portion of an odorless naphtha of poor odor quality, having a boiling range of about 350° to 400.° F. and obtained by the steam distillation of heavy alkylate originating from alkylate prepared by the sulfuric acid process, was shaken for 10 minutes with a 10 cc. portion of an aqueous solution prepared by dissolving 10 grams of hydrazine and 6.3 grams of sodium hydroxide in 90 cc. of water. After this treatment, the naphtha and aqueous phases were separated. Following this, the naphtha was water-washed with 10 volume percent portions of water until the washings were neutral to phenolphthalein indicator. The washed naphtha product had a very slight but pleasant odor, and was marketable. The naphtha product, when tested for odor, was found to show a great improvement in odor quality over the untreated naphtha.

EXAMPLE II

A similar treatment of 100 cc. of the original odorless naphtha of poor odor quality with 10 cc. of water was without effect on the odor quality and the product was unmarketable.

EXAMPLE III

Using the conditions of Example I, a treating solution comprising 5% aqueous sodium hydroxide was used to treat another 90 cc. portion of the poor-odor-quality odorless naphtha. The odor of the product was slightly unpleasant, and the product was unmarketable as an odorless naphtha.

EXAMPLE IV

About 9 parts by volume of odorless naphtha of poor odor quality, as previously identified, and one part by volume of liquid ammonia were contacted for 10 minutes at a temperature of −40° to −45° F. Following this, the naphtha was water-washed with 10 volume percent portions of water until the washings were neutral to phenolphthalein indicator. The washed product had a definite, slight, pleasant odor, and was unmarketable as an odorless naphtha.

EXAMPLE V

The conditions of Example IV were repeated using a solution containing 4 weight percent hydrazine sulfate in liquid ammonia. After water-washing to neutrality, the naphtha phase had a slight, pleasant odor, but was unmarketable as an odorless naphtha.

EXAMPLE VI

Ninety cc. of odorless naphtha of poor odor quality, prepared from the alkylate previously described, was shaken for 10 minutes with an aqueous solution containing 2.5 weight percent hydrazine sulfate and 5 weight percent sodium hydroxide. The treated naphtha was washed with 10 volume percent portions of water until the washings were neutral to phenolphthalein indicator. The product separated was essentially odorless and marketable.

EXAMPLE VII

Ninety cc. of odorless naphtha of poor odor quality, prepared from alkylate produced by the sulfuric acid process, was shaken for 10 minutes (at ambient temperature) with 10 cc. of aqueous treating solution containing 4.8 wt. percent of hydrazine sulfate and 3.4 wt. percent sodium hydroxide. After the mixture of naphtha and aqueous treating solution had stood for 24 hours, there was a very noticeable improvement in the odor of the naphtha and a marketable product was obtained.

In view of the foregoing examples, it is seen that water alone, alkali alone, liquid ammonia alone, or liquid ammonia with hydrazine are ineffective in removing the odorous materials from odorless naphthas. However, quite unexpectedly, the combination of aqueous alkali and hydrazine has the property of transforming an unmarketable product to one which is marketable as far as the odor is concerned. In the foregoing examples the volume ratio of naphtha to treating solution was maintained at about 9 to 1. In general, this represents a rather low volume ratio, and volume ratios as high as 500 to 1 may be successfully employed. The temperature of treatment in the foregoing examples was about 85° F., except in the cases where liquid ammonia was used. In general, the temperature may vary from ambient temperatures, which are preferred, up to as high as 200° F., that is, any temperature at which the treating solution is still fluid and homogeneous. The ratio of naphtha to treating solution during counter-current treatment is preferably maintained at about 2–50/1.

The treating solution containing hydrazine and free sodium hydroxide is obtained by adding to water a hydrazine salt and an excess of sodium hydroxide over that required to liberate hydrazine from the salt. The treating solutions used in this invention can also be prepared by using hydrazine nitrate or hydrazine hydrochloride instead of hydrazine sulfate.

Another way of preparing the treating solution is to add free hydrazine, which has a boiling point of about 113.5° C., and sodium hydroxide to water. If free hydrazine is used, it is desirable to have fresh material available since this material on storage over a long time tends to develop odorous decomposition products which are deleterious to the naphtha during treatment.

The treating solutions may contain 0.1 to 25 percent by weight of hydrazine (as the free base) or an equivalent amount of hydrazine salt, monoalkyl- or N,N-dialkylhydrazine or salt thereof, and about 0.1 to 30 percent by weight of sodium, potassium, cesium, or rubidium hydroxide. Although free alkali greatly speeds up the reaction of the hydrazine compound with the odorous compounds in the naphtha, it is not essential for the purposes of this invention. Solutions of hydrazine alone in the order of 1 to 15%, or solutions containing a hydrazine salt, or monoalkyl- or N,N-dialkylhydrazine or salt thereof, with an insufficient amount of alkali to free all of the hydrazine or substituted hydrazine from the salt may also be used in treating essentially odorless naphthas. However, in the use of solutions that do not contain free alkali metal hydroxide, it is preferable that the contact time be increased. If hydrazine salts are used, the alkali may be added in increments as the treating solution is used over and over with different batches of essentially odorless naphtha. Hydrazine salts are the best sources of hydrazine for perparing treating solutions for essentially odorless naphthas, since they are stable and do not form odorous compounds on storage which could damage the odor quality of the naphtha during treatment.

However, the use of free caustic, that is, an excess over that required to free hydrazine from its salts in the treating solution, is desirable since the treating time is minimized.

The hydrazine compounds used herein include water soluble diamide compounds which have the property of eliminating odor from odorous hydrocarbons, or preventing the formation of odor in odor-unstable hydrocarbons, particularly naphthas and alkylates. The preferred group of compounds come within the formula,

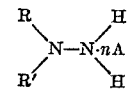

wherein R is a substituent selected from the group of hydrogen and alkyl groups having from 1 to 6 carbon atoms, R' is a substituent selected from the group of hydrogen and alkyl groups having 1 to 6 carbon atoms, A is an organic or inorganic acid, e.g., hydrogen chloride, sulfuric acid, acetic acid, or nitric acid, and $n$ is an integer or fraction from 0 to 2. R and R' may be straight-chain, branched-chain, or tertiary in structure. In addition to hydrazine and hydrazine salts, the formula includes the following enumerated species of hydrazine compounds:

Methylhydrazine
Ethylhydrazine
Propylhydrazine
Butylhydrazine
Amylhydrazine
N,N-dimethylhydrazine
N,N-diethylhydrazine
N,N-dipropylhydrazine
N,N-dibutylhydrazine
N,N-diamylhydrazine
M-methyl-N-ethylhydrazine
M-methyl-N-propylhydrazine
M-methyl-N-butylhydrazine
N-methyl-N-amylhydrazine
N-ethyl-N-propylhydrazine N-ethyl-N-butylhydrazine
N-ethyl-N-amylhydrazine
N-propyl-N-butylhydrazine
N-propyl-N-amylhydrazine
N-butyl-N-amylhydrazine Examples of some of the hydrazine salts include:
Methylhydrazine hydrochloride
Ethylhydrazine nitrate
Propylhydrazine sulfate
Butylhydrazine hydrochloride
Amylhydrazine nitrate
N,N-dimethylhydrazine nitrate
N,N-diethylhydrazine sulfate
N,N-dipropylhydrazine hydrochloride
N,N-dibutylhydrazine nitrate
N,N-diamylhydrazine sulfate
N-methyl-N-ethylhydrazine sulfate
N-methyl-N-propylhydrazine nitrate
N-methyl-N-butylhydrazine nitrate
N-butyl-N-amylhydrazine sulfate The naphthas that can be treated in accordance with this invention include (1) heavy alkylates or heavy alkylate fractions boiling from 300° F. to as high as 600° F., and which contain small amounts of traces of odorous materials arising during manufacturing or processing steps, or during storage; and (2) petroleum fractions boiling from about 300° F. to 600° F. which have been essentially denuded of their aromatic content by treatment with silica gel or other means. The invention has particular application to naphthas boiling in the range of 300–525° F., including heavy alkylate fractions prepared by the distillation of heavy alkylates at pressures under atmospheric and/or with steam. The heavy alkylates are obtained as bottoms from the distillation of alkylates, and many constitute 5–20% of the whole alkylates. Alkylates are produced by the alkylation of olefins with alkanes. An example of such material would be the product of the alkylation of isobutylene with isobutane in the presence of hydrofluoric acid.

The following table gives the distillation characteristics of a number of naphthas which can be treated in accordance with this invention.

tain up to 6 carbon atoms, and mixtures of the aforementioned compounds. For simplicity in this description, the term "hydrazine compounds" is used to include the aforementioned groups of compounds. Having thus described the invention, the only limitations attaching thereto appear in the appended claims.

The embodiments of the invention in which an exclusive property or privilege is claimed are defined as follows:

1. The process of producing odorless petroleum fractions which comprises contacting a petroleum fraction boiling from about 300° to 600° F. characterized by odor instability and being essentially free of aromatic hydrocarbons of the group consisting of heavy alkylates prepared by the acid alkylation of olefins with alkanes, fractions of said heavy alkylates and straight run naphtha fractions which have been essentially denuded of their aromatic content with a solution containing about 0.1 to 30 percent by weight of an alkali metal hydroxide and about 0.1 to 25 percent by weight of a hydrazine compound selected from the group consisting of hydrazine, hydrazine hydrochloride, hydrazine sulfate, alkylhydrazines, N,N-dialkylhydrazines, alkylhydrazine hydrochlorides, N,N-dialkylhydrazine hydrochlorides, alkylhydrazine sulfates and N,N-dialkylhydrazine sulfates and their mixtures, wherein the alkyl groups contain from 1 to 6 carbon atoms, and recovering a stable petroleum product.

2. The process in accordance with claim 1 in which the hydrazine compound is hydrazine.

3. The process in accordance with claim 1 in which the hydrazine compound is hydrazine hydrochloride.

4. The process in accordance with claim 1 in which the hydrazine compound is hydrazine sulfate.

5. The process in accordance with claim 1 in which the hydrazine compound is an alkylhydrazine.

6. The process in accordance with claim 1 in which said petroleum fraction is an alkylate boiling in the range of 343–375° F. prepared by the acid alkylation of olefins with alkanes.

*Tests on Representative Odorless Naphthas and Heavy Alkylates*

| API Grav. | Distillation | | | | | | | | | | | | | | | | Odor |
|---|---|---|---|---|---|---|---|---|---|---|---|---|---|---|---|---|---|
| | IBP | 5% | 10% | 20% | 30% | 40% | 50% | 60% | 70% | 80% | 90% | 95% | E.P. | Percent Rec. | Percent Res. | Percent Loss | |
| 54.0 [1] | 347 | 354 | 356 | 358 | 360 | 363 | 366 | 369 | 374 | 383 | 414 | 466 | 517 | 98.0 | 1.6 | 0.4 | slight (essentially odorless). |
| 54.5 [2] | 352 | 358 | 360 | 360 | 361 | 362 | 362 | 363 | 364 | 366 | 370 | 377 | 393 | 98.8 | 1.2 | 0.0 | Do. |
| 53.6 [2] | 360 | 367 | 368 | 369 | 369 | 370 | 371 | 372 | 373 | 376 | 380 | 388 | 413 | 98.6 | 1.2 | 0.2 | Do. |
| 51.4 [2] | 372 | 378 | 380 | 382 | 385 | 388 | 392 | 397 | 408 | 425 | 481 | 540 | 573 | 99.0 | 1.0 | 0.0 | Do. |
| 51.4 [2] | 361 | 366 | 368 | 371 | 373 | 376 | 381 | 386 | 396 | 416 | 468 | 509 | 543 | 98.1 | 1.4 | 0.5 | Do. |
| 55.4 [1] | 351 | 354 | 355 | 356 | 357 | 358 | 359 | 360 | 362 | 365 | 368 | 372 | 385 | 98.7 | 1.3 | 0.0 | Do. |
| 54.1 [1] | 355 | 359 | 360 | 363 | 364 | 367 | 369 | 373 | 379 | 388 | 418 | 468 | 512 | 98.4 | 1.1 | 0.5 | Do. |
| 55.2 [1] | 348 | 352 | 353 | 355 | 356 | 357 | 359 | 361 | 363 | 365 | 370 | 377 | 406 | 98.8 | 1.2 | 0.0 | Do. |

[1] Made from alkylate produced by the hydrofluoric acid process.
[2] Made from alkylate produced by the sulfuric acid process.

The process of this invention provides a method of producing odorless naphthas by treatment with an alkaline solution containing hydrazine or monoalkyl- or N,N-dialkylhydrazine, or salt thereof. The process is most conveniently carried out by the use of aqueous alkali metal hydroxide solutions containing hydrazine and/or compounds of hydrazine such as hydrazine hydrate, hydrazine salts, monoalkylhydrazines, N,N-dialkylhydrazines, salts of monoalkylhydrazines, and salts of N,N-dialkylhydrazines in which the alkyl groups con- References Cited in the file of this patent
UNITED STATES PATENTS 2,882,232    Haines et al.    Apr. 14, 1959
2,930,750    Wendland    Mar. 29, 1960
2,966,455    Stuart    Dec. 27, 1960

OTHER REFERENCES

Audrieth et al.: The Chemistry of Hydrazine; Wiley and Sons, Inc., New York; 1951, pp. 226 and 227. (Copy in Division 59.)